JOHN H. WALKER.
Improvement in Pea-Nut Thrasher and Separator.
No. 127,392. Patented May 28, 1872.

Witnesses:
G. Mathys.
Thos. H. H. Durand.

Inventor:
John H. Walker
Per
Attorneys.

127,392

UNITED STATES PATENT OFFICE.

JOHN H. WALKER, OF WALKER'S LANDING, TENNESSEE.

IMPROVEMENT IN PEA-NUT THRASHERS AND SEPARATORS.

Specification forming part of Letters Patent No. 127,392, dated May 28, 1872.

Specification describing a new and useful Thrasher and Separator for Pea-Nuts, invented by JOHN H. WALKER, of Walker's Landing, in the county of Decatur and State of Tennessee.

The invention will first be fully described and then clearly pointed out in the claims.

Figure 1:
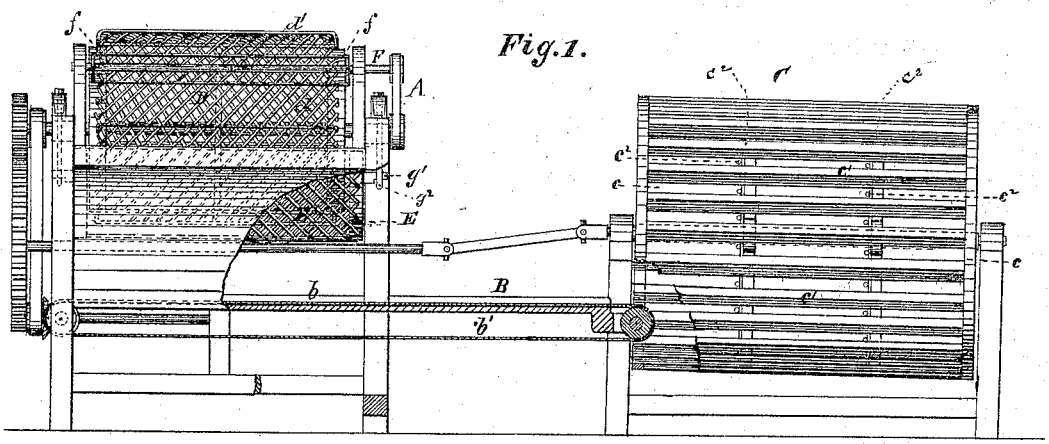
Figure 2:
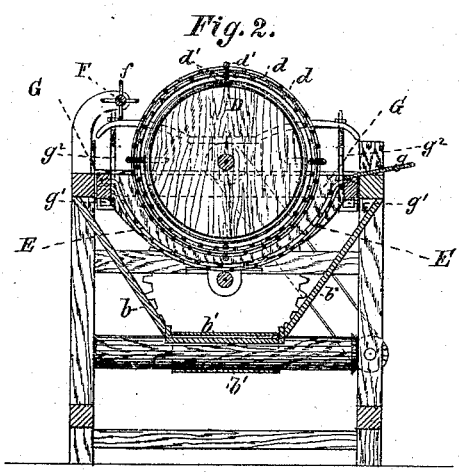

Figure 1 is a longitudinal and sectional elevation of the thrasher and separator. Fig. 2 is a transverse section of the thrasher.

A represents the thrasher, B the endless carrier, and C the separator. D is a revolving cylinder of diagonally-crossed wires $d$, which work against a concave, E, correspondingly constructed. The cylinder D is also provided with longitudinal wires $d'$, which work in conjunction with concave and with longitudinal wires $f$ on a revolving shaft, F. G is the frame, in which concave E is held, and which is provided with the incline $g$ and end projection $g^1$. These latter are held by supports, which consist of metal rods $g^2$, threaded at upper end, and crooked at the lower end, so that the concave E may be adjusted closer to or remote from the cylinder D. $b$ is a rigid trough arranged beneath the concave E, and over which moves the endless carrier-belt $b'$. The separator C consists of an open-work cylinder, $c$, formed of straight longitudinal slats $c^1$, with intervals between them smaller than a peanut, and of transverse screens $c^2$, sufficiently coarse to allow the pea-nuts to pass readily therethrough. The cylinder declines forward, so as to cause the movable pea-nuts to gradually find their way out at the open end.

The mode of operation is as follows: The vines, filled with pea-nuts, are pushed down the incline $g$ until they are caught by the revolving cylinder D. The reticulated surfaces of cylinder and concave thrash and tear the vines to pieces and separate the nuts from them. The bulk of the vines are carried up and on the other side of cylinder by the longitudinal wires $d$, and then are removed by the revolving wires $f$ from the machine. The remaining bits of vine and the nuts fall into trough $b$ and on the endless carrier $b'$, by which they are transferred to the separator C. As soon as they reach the open-work and revolving cylinder $c$ the bits of vine and the smaller nuts begin to pass through the spaces between slats $c^1$, and, as they are arrested by the coarse transverse screen-partitions $c^2$ $c^2$, become effectually separated from the large and merchantable nuts, which themselves pass onto the end and fall into some receptacle there prepared for them.

By this machine the nuts can be thrashed, cleaned, and prepared for market at a small cost and with great economy of time.

Having thus described my invention, what I claim as new, and desire to secure by Letters Patent, is—

1. The combination of a cylinder, D, consisting of diagonal wires $d$ and longitudinal wires $d'$, with a wire concave, E, as and for the purpose described.

2. The revolving longitudinal wires $f$, combined with the revolving cylinder D $d$ $d'$, constructed as described, as and for the purpose specified.

3. In combination with the concave E, the metallic rods $g^2$, threaded at their upper ends, for supporting and adjusting said concave, in the manner described.

4. The separator C, consisting of a longitudinally-slatted cylinder $c$ $c^1$, when provided with screens $c^2$, arranged to operate as and for the purpose described.

5. A pea-nut thrasher, consisting of the cylinder D, concave E, separator C, and endless carrier B, combined, constructed, and arranged to operate substantially in the manner set forth.

JOHN H. WALKER.

Witnesses:
S. ODLE,
E. WALKER.